Patented June 16, 1925.

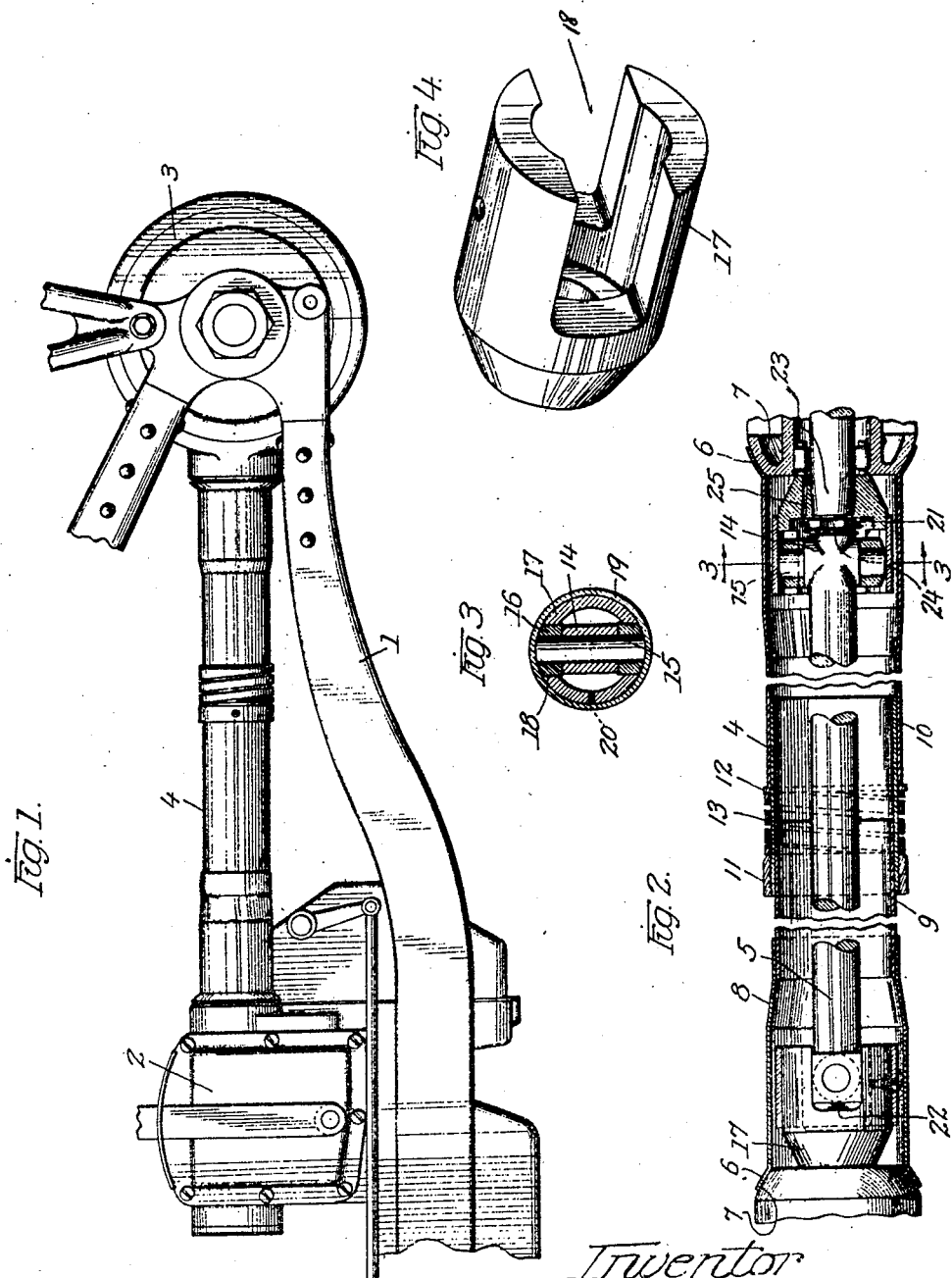

1,542,806

UNITED STATES PATENT OFFICE.

ADAM ZISKA, JR., OF MILWAUKEE, WISCONSIN, ASSIGNOR TO HARLEY-DAVIDSON MOTOR CO., OF MILWAUKEE, WISCONSIN, A CORPORATION OF WISCONSIN.

TRANSMISSION.

Application filed August 18, 1919. Serial No. 318,373.

*To all whom it may concern:*

Be it known that I, ADAM ZISKA, Jr., a citizen of the United States, residing at Milwaukee, in the county of Milwaukee and State of Wisconsin, have invented new and useful Improvements in Transmissions, of which the following is a specification.

This invention relates to transmissions.

One of the objects of this invention is to provide a transmission which is readily accessible.

A further object is to provide a transmission which will automatically adjust itself to variations in alinement.

A further object is to provide a transmission in which worn or broken parts may be readily repaired without dismantling other portions of the vehicle.

A further object is to provide a transmission and housing which is of attractive appearance.

A further object is to provide a transmission housing which will automatically adjust itself to variations in alinement.

A further object is to provide a transmission for vehicles in which there are no strains produced incident to a slight variation in the relative position at the forward and rear end of the transmission.

A further object is to provide a transmission in which the parts may be readily interchanged with other similar parts without necessitating the dismantling of any portion of the machine, except the transmission itself.

A further object is to provide a transmission for vehicles in which a small number of parts are employed and in which the structure is of simple and rugged design.

A further object is to provide a transmission which may be readily manufactured.

Other objects will appear.

An embodiment of the invention is shown in the accompanying drawing.

Figure 1 is a side elevation of a part of the rear portion of a motor-cycle.

Fig. 2 is a view partly in section of the transmission, housing, and associated parts.

Fig. 3 is a section on line 3—3 of Fig. 2.

Fig. 4 is a perspective of a part of one of the universal couplings.

Fig. 1 shows a portion of a motor-cycle frame 1 which carries the motor, the casing 2 for the change gear mechanism, and the casing 3 for the rear wheel bevel gears. Between the casings 2 and 3 extends a telescopic housing 4 for the transmission shaft 5 and the universal couplings.

Fig. 2 shows the construction of the telescopic housing 4. This housing is provided with spherical ends 6 which engage similar spherical surfaces 7 formed on a portion of the casings 2 and 3. This tubular telescopic housing is composed of a forward portion 8 to which is permanently joined a central portion 9. A sleeve 10 threaded at its forward end is permanently joined to the central portion 9, and carries upon such threaded portion, a nut 11. The rear portion of this tubular, telescopic housing slides over the portion 10 of the forward part of the housing and terminates in a shoulder 12. A helical spring 13 bears against the shoulder 12 and the nut 11 and tends to force the forward and rear portion of the telescopic housing apart, thereby insuring a firm seating of the spherical portions 6 upon the surfaces 7. This construction of casing or housing allows a slight play between the forward and rear bearing surface and adjusts itself to irregularities in alinement.

Figures 2, 3 and 4 show the construction of the transmission shaft and universal couplings. The shaft 5 is provided at each end, with hubs 14, through which transverse pins 15 pass. The outer ends of these pins are provided with sliding blocks 16 of rectangular outline. The outer surfaces of these blocks are spherical. The driving and driven shafts are provided with hubs 17, which are slotted to accommodate the sliding blocks 16. These blocks 16 are retained in position within the slots 18, in the hubs 17, by means of sleeves 19 surrounding the hubs and held in place by screws 20. To prevent unnecessary longitudinal play of shaft 5 a conical spring 21 is positioned between the rear end of the shaft 5 and the bottom of the hollow part of the rear hub 17. This spring forces the shaft 5 forward and causes the projection 22 to bear against the end of the driving shaft. The hubs 17 are secured upon the driving and driven shaft, as shown at the right hand end of Fig. 2, by forcing the conical end 23 of the driving or driven shaft into a cooperating conical opening of the hub and securing said hub in place by means of a nut 24 threaded upon a reduced portion of the shaft. For the purpose of oiling the universal couplings, the hubs are provided with passages 25 through which oil from the bearings may pass.

Fig. 3 shows the relation between the size of the hubs 14, of the shaft 5, and the width of the slots 18 in the hubs 17. The diameter of the hubs 14 is smaller than the width of the slots 18 in the hubs 17. The purpose of this is to allow the ready dismantling, or uncoupling, of the transmission shaft 5 from the driving and driven hubs 17. When it is desired to dismantle or remove this transmission shaft and housing, the nut 11 is unscrewed from the threaded portion of the member 10, and is slid forward along the sleeve 9. This releases the spring 13 and allows the forward and rear portions of the casing to telescope, thereby exposing the universal couplings at each end of the transmission. One of the screws 20 is removed and the sleeve 19 is slipped off one of the hubs 17, thereby allowing the shaft 5 to be rocked sidewise. This sidewise motion of the shaft is continued until one end of the shaft is free from engagement with the corresponding hub 17. Thereafter the shaft is drawn away from the other hub and the shaft and housing are bodily removed from the motor-cycle.

This ease of dismantling allows the ready inspection or replacement of the transmission shaft and associated parts without necessitating the dismantling of any other portions of the motor-cycle. The universal couplings at the forward and rear portion of the transmission shaft and the spherical formation at the ends of the casing allow both the casing and the shaft to adjust themselves to readily compensate for changes in relative positions of the driving and driven members, lack of adjustment or alignment which might result from springing or twisting of the motor-cycle frame, or variations due to manufacture.

Obviously other structures may be devised which will embody the invention herein set forth.

I claim:

1. A transmission shaft housing comprising telescopically disposed tubular members, a nut threaded on the periphery of one member, a shoulder formed on the periphery of another of the members, and a compression spring interposed between the nut and the shoulder.

2. A transmission for vehicles comprising a shaft, a universal coupling at each end thereof, a casing surrounding said shaft and said universal couplings, and means whereby the casing may be telescoped to permit access to the universal coupling.

3. A transmission for a vehicle comprising a transmission shaft, a universal coupling at each end thereof, a casing for the shaft and couplings, said casing being formed of a plurality of telescoping members, a spring tending to hold said members apart, and means for relieving said members of the force of said spring so as to allow said members to be moved toward each other whereby access may be had to the couplings.

4. A transmission shaft housing for vehicles comprising telescopically mounted members, a nut threaded on the periphery of one of the members, a shoulder formed on the end of the other member and a spring surrounding one of the members and interposed between the nut on the one member and the outer end of the shoulder on the other member.

5. A transmission for vehicles comprising slotted driving and driven members, a shaft therebetween having laterally projecting members at each end thereof cooperating with the slotted portion of the driving and driven members, a spring mounted betwewen one of said members and the shaft, one of said members comprising a hub, a nut for holding the hub in position and a telescopic housing for said shaft permitting access to said members.

6. A transmission for vehicles comprising driving and driven members having slotted portions, a shaft therebetween having lateral projections at each end thereof cooperating with the slotted portions of the driving and driven members to form universal couplings, a spring between one of said members and the shaft, and a spring pressed telescopic housing for said transmission permitting access to the universal couplings.

7. A transmission comprising slotted driving and driven members, a shaft therebetween having laterally projecting members at each end cooperating with the slotted portion of the driving and driven members to form universal couplings, a spring between the end of the shaft and one of said members, a spring expanded, telescopic housing for said transmission permitting access to said universal couplings, said housing terminating in spherical ends, and cooperating spherical surfaces at the forward and rear portion of the transmission.

8. A transmission for vehicles comprising a shaft, a universal coupling at each end thereof, and a casing enclosing said shaft and couplings, said casing comprising a pair of telescoping members provided with means to compress a spring between the same to urge said members apart, the means of one of said members being removable to release said members from the action of said spring.

In witness whereof, I have hereunto subscribed my name.

ADAM ZISKA, Jr.